United States Patent Office 3,697,434
Patented Oct. 10, 1972

3,697,434
CHEMILUMINESCENT SPRAY FORMULATION
Sydney Shefler, China Lake, Calif., assignor to the United States of America as represented by the Secretary of the Navy
No Drawing. Filed Oct. 5, 1965, Ser. No. 493,284
Int. Cl. C09k 3/00
U.S. Cl. 252—188.3    5 Claims The invention described herein may be manufactured and used by or for the Government of the United States of America for governmental purposes without the payment of any royalties thereon or therefor.

The present invention relates to an oxyluminescent spray formulation and to the preparation thereof.

There are many sprays available for almost every purpose. However, there is a dearth of spray formulations which will "glow" or emit light in the presence of the oxygen in the air. The present invention provides a chemiluminescent spray formulation using as one of its chief ingredients a peraminoethylene which is activated in the presence of air giving off a blue-green light.

It is therefore an object of the present invention to provide a spray formulation which can be used for general illumination, signaling, and for nighttime sea or land rescue markers.

Another object is to provide a spray at relatively low cost which has unlimited shelf life and has a light duration of up to twelve hours.

Yet another object is to provide a light producing material which does not adversely affect night vision.

Other objects and features of the present invention will become apparent to those skilled in the art as the description proceeds.

The invention comprises primarily a mixture of an oxyluminescent compound such as one of the peraminoethylenes and a liquefied gas compatible with the oxyluminescent compound. The active ingredient is a peraminoethylene of the formula

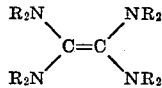

in which the R's which can be alike or different are straight or branched chain alkyl or cycloalkyl hydrocarbon radicals of from 1-10 carbons each of which can be joined pairwise on one nitrogen to form 3-5 membered monoaza heterocycles and on two nitrogens to form 3-7 membered diaza heterocycles. The member of the peraminoethylene series which was used herein was tetrakis(dimethylamino)ethylene because it was easily available. Others which can be used are tetrakis(N-pyrrolidinyl)ethylene,
1,1′,3,3′-tetramethyl-$\Delta^{2,2'}$-bi(imidazolidine),
1,1′,3,3′-tetraethyl-$\Delta^{2,2'}$-bi(imidazolidine),
1,1′-diethyl-3,3′-dimethyl-$\Delta^{2,3}$-bi(imidazolidine), and
tetrakis(dimethylamino-methyleneamino)ethylene.

The liquefied gas is an aerosol propellant which must be compatible with the chemiluminescent compounds. It must not adversely affect storage or light output of the compound when exposed to air. Several of the "Freon" aerosol propellants mixed satisfactorily thinning the tetrakis(dimethyl)amino to a viscosity which was easily dispensable from an aerosol spray container. "Freon" is the trade name for a group of halogenated hydrocarbons containing one or more fluorine atoms. Among those used were octafluorocyclobutane (Freon C–318), hexafluoroethane (Freon-116), sym-dichlorotetrafluoroethane (Freon-114), 1,1,2-trichloro-1,2,2 - trifluoroethane (Freon - 113), chlorodifluoromethane (Freon-22), tetrafluoromethane (Freon-14), chlorotrifluoromethane (Freon-13), dichlorodifluoromethane (Freon-12), and trichlorofluoromethane (Freon-11). Other liquefied gases were also used either alone or in mixtures. These included butane, ethane, propane, carbon dioxide, nitrogen, nitrous oxide and dimethylether.

To the basic mixture comprising tetrakis(disubstituted-amino)ethylene and liquefied gas various flocking materials were added which produced light of increased brightness and longer duration. These materials included cotton, nylon, Dacron, polypropylene and polyethylene fibers.

In attempting to get better physical properties for the basic spray formulation it was found that alkylsiloxanes such as high viscosity dimethylsilicone fluid (Viscasil 10,000), methylsilicone, a gum-like material sold as SE–30, dimethylsilicone, another gum designated SE–75, and methylvinylsilicone appeared to give the formulation better adhesive and coating qualities. Non-aromatic hydrocarbon waxes such as paraffin and amorphous wax such as mineral oil (Nujol) and petrolatum improved the processability of the formulation.

The present formulation provides an easily dispensable material which may be prepared of such a predetermined viscosity as desired. It may be of a viscosity so as to permit it to be pumped out by squeezing a collapsible container or by operating a small pump. However, the spray formulation having a viscosity adequate to spray from an aerosol type container is the most practical. When sprayed onto an object the propellant (liquefied gas) boils off at ambient temperature in a few seconds leaving the light producing ingredient.

The following examples are given to better illustrate the invention but should not be considered as a limitation thereof.

EXAMPLE I

Ingredients:                                    Percent by weight
Tetrakis(dimethylamino)ethylene (TMAE) __  25
Dimethylsilicone gum (SE–30) _____  25
Butane _____  34
Octafluorocyclobutane (Freon C–318) _____  14.5
Carbon dioxide _____  1.5

The tetrakis(dimethylamino)ethylene and dimethylsilicone gum were mixed together in an inert atmosphere, then added to the mixture of liquefied gases comprising butane, octafluorobutane and carbon dioxide. The formulation was poured into an aerosol type dispenser equipped with a suitable valve. To produce a light source it is only necessary to open the valve and direct the spray. The light-producing, self-adhering formulation reacts with the oxygen present in the air giving off a blue-green glow for periods up to twelve hours. When sprayed onto an object the propellant boils off at ambient temperatures a few seconds leaving the light-producing ingredient.

EXAMPLE II

Another formulation was prepared using the same ingredients as set out in Example I to which nylon fibers were added thereby forming a flocculent oxyluminescent spray. When this formulation was sprayed onto an object it was immediately apparent that there was increased luminesce. This was due to the increased area carrying the chemiluminescent ingredient. The duration of light output was also increased.

EXAMPLE III

Ingredients:                                    Percent by weigh
Tetrakis(dimethylamino)ethylene _____ 50
Dichlorodifluoromethane (Freon-12) _____ 12

The ingredients were mixed in an inert atmosphere and a spray can was filled. When sprayed onto an object a bright light-producing spot resulted.

EXAMPLE IV

Ingredients: Percent by weight
- Oxyluminescent mixture _____ 50
- Propellant mixture (liquefied gas) _____ 50

The oxyluminescent mixture was prepared at ambient temperature in an inert atmosphere as follows: About 30% by weight dimethylsilicone gum (SE–30) and about 70% by weight tetrakis(dimethylamino) ethylene were mixed together until homogeneity resulted. A propellant (liquefied gas mixture) comprising 68% by weight butane, 30% by weight octafluorocyclobutane and about 2% by weight carbon dioxide was formulated. About equal parts of these two mixtures were combined and filled into a pressurized container. This spray formulation produced a very effective light-producing self-adhering product which reacted with the oxygen in the air producing a medium light intensity of over twelve hours.

EXAMPLE V

The formulation set out in Example IV above was treated with cotton flocking and filled into a pressurized container. This flocculent spray produced a bright tacky signal which adhered to a cardboard box. To intensify or increase the length of time the light is effective other inert fillers or flocking materials were found to be very effective. Dacron, polypropylene and polyethylene fibers and particles appear to improve the light intensity of the oxyluminescent formulation.

Dimethyl ether was used in lieu of octafluorocyclobutane (C–318) with equal success.

This invention permits oxyluminescent chemicals with or without fillers in solution with a liquefied gas (aerosol propellant) to be dispensed as a spray, bead, spot, ribbon or other form depending on the pressure container used. Reliability approaches 100% over an infinite time period. Once the formulation is packaged it requires no maintenance to keep in a readiness condition. These formulations eliminate the need for a two-compartment piston equipped can to dispense chemiluminescent materials.

Obviously many modifications and variations of the present invention are possible in the light of the above teachings. It is therefore to be understood that within the scope of the appended claims the invention may be practiced otherwise than as specifically described.

What is claimed is:

1. An oxyluminescent spray formulation comprising a mixture of
   - a chemiluminescent compound,
   - a liquefied gas and
   - a flocking material;
   - said chemiluminescent compound being a member selected from the group consisting of tetrakis(dimethylamino)ethylene, tetrakis(N - pyrrolidinyl)ethylene, 1,1',3,3' - tetramethyl - $\Delta^{2,2'}$ - bi(imidazolidine), 1,1',3,3'-tetraethyl - $\Delta^{2,2'}$ - bi(imidazolidine), 1,1'-diethyl-3,3'-dimethyl - $\Delta^{2,2'}$ - bi(imidazolidine) and tetrakis(dimethylamino-methyleneamino)ethylene;
   - said liquefied gas being a member selected from the group consisting of butane, ethane, propane, carbon dioxide, nitrogen, nitrous oxide, dimethylether, dichlorodifluoromethane, trichlorofluoromethane, chlorodifluoromethane, chlorotrifluoromethane, 1,1,2 - trichloro - 1,2,2-trifluoroethane, dichlorotetrafluoroethane, octafluorocyclobutane, hexafluoroethane, tetrafluoromethane and mixtures thereof, and
   - said material being a member selected from the group consisting of cotton, nylon, Dacron, polypropylene and polyethylene.

2. An oxyluminescent spray formulation comprising a mixture of
   - a chemiluminescent compound selected from the group consisting of tetrakis(dimethylamino)ethylene, tetrakis(N - pyrrolidinyl)ethylene, 1,1',3,3' - tetramethyl-$\Delta^{2,2'}$-bi(imidazolidine), 1,1',3,3'-tetraethyl - $\Delta^{2,2'}$ - bi(imidazolidine), 1,1'-diethyl - 3,3' - dimethyl-$\Delta^{2,2'}$-bi(imidazolidine) and tetrakis(dimethylaminomethyleneamino)ethylene;
   - an alkylsiloxane selected from the group consisting of methylsilicone, dimethylsilicone and methylvinylsilicone; and
   - a liquefied gas selected from the group consisting of butane, ethane, propane, carbon dioxide, nitrogen, nitrous oxide, dimethylether, dichlorodifluoromethane, trichlorofluoromethane, chlorodifluoromethane, chlorotrifluoromethane, 1,1,2 - trichloro-1,2,2-trifluoroethane, dichlorotetrafluoroethane, octafluorocyclobutane, hexafluoroethane, tetrafluoromethane and mixtures thereof.

3. An oxyluminescent spray formulation comprising a mixture of
   - a chemiluminescent compound selected from the group consisting of tetrakis(dimethylamino)ethylene, tetrakis(N - pyrrolidinyl)ethylene, 1,1',3,3' - tetramethyl-$\Delta^{2,2'}$-bi(imidazolidine), 1,1',3,3'-tetraethyl - $\Delta^{2,2'}$ - bi(imidazolidine), 1,1'-diethyl-3,3'-dimethyl - $\Delta^{2,2'}$ - bi(imidazolidine) and tetrakis(dimethylaminomethyleneamino)ethylene;
   - an alkylsiloxane selected from the group consisting of methylsilicone, dimethylsilicone and methylvinylsilicone;
   - a liquefied gas selected from the group consisting of butane, ethane, propane, carbon dioxide, nitrogen, nitrous oxide, dimethylether, dichlorodifluoromethane, trichlorofluoromethane, chlorodifluoromethane, chlorotrifluoromethane, 1,1,2 - trichloro-1,2,2-trifluoroethane, dichlorotetrafluoroethane, octafluorocyclobutane, hexafluoroethane, tetrafluoromethane and mixtures thereof; and
   - a flocking material selected from the group consisting of cotton, nylon, Dacron, polypropylene and polyethylene.

4. An oxyluminescent spray formulation comprising a mixture of
   - tetrakis(dimethylamino)ethylene;
   - dimethylsilicone;
   - butane;
   - octafluorocyclobutane;
   - carbon dioxide; and
   - polyethylene.

5. An oxyluminescent spray formulation comprising the mixture of
   - tetrakis(dimethylamino)ethylene;
   - a silicone fluid;
   - a liquefied gas; and
   - a flocking material.

References Cited

UNITED STATES PATENTS

| | | | |
|---|---|---|---|
| 3,211,665 | 10/1965 | Allen et al. | 252—301.2 |
| 3,239,406 | 3/1966 | Coffman et al. | 252—301.2 X |
| 3,239,519 | 3/1966 | Winberg | 252—301.2 X |
| 3,264,221 | 8/1966 | Winberg | 252—301.2 X |
| 3,360,473 | 12/1967 | Winberg | 252—188.3 |

OTHER REFERENCES

Herzka, A., and Pickthall, J.: Pressurized Packaging (Aerosols). N.Y. Academic Press Inc., 1958, chapter III, pp. 19–77.

CARL D. QUARFORTH, Primary Examiner

S. J. LECHERT, JR., Assistant Examiner

U.S. Cl. X.R.

252—186, 301.3, 305